US012615166B2

(12) United States Patent
Ananthanarayanan

(10) Patent No.: US 12,615,166 B2
(45) Date of Patent: Apr. 28, 2026

(54) OVERLAY MULTICAST ORCHESTRATION IN SOFTWARE-DEFINED WIDE AREA NETWORK

(71) Applicant: HEWLETT PACKARD ENTERPRISE DEVELOPMENT LP, Houston, TX (US)

(72) Inventor: Shankar Kambat Ananthanarayanan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 582 days.

(21) Appl. No.: 17/811,939

(22) Filed: Jul. 12, 2022

(65) Prior Publication Data

US 2024/0022443 A1 Jan. 18, 2024

(51) Int. Cl.
| | |
|---|---|
| *H04L 12/18* | (2006.01) |
| *H04L 45/028* | (2022.01) |
| *H04L 45/16* | (2022.01) |
| *H04L 45/48* | (2022.01) |
| *H04L 45/64* | (2022.01) |

(52) U.S. Cl.
CPC ............. *H04L 12/18* (2013.01); *H04L 12/185* (2013.01); *H04L 12/1886* (2013.01); *H04L 45/028* (2013.01); *H04L 45/16* (2013.01); *H04L 45/48* (2013.01); *H04L 45/64* (2013.01)

(58) Field of Classification Search
CPC ....... H04L 12/18; H04L 45/64; H04L 12/185; H04L 12/1886; H04L 45/16; H04L 45/028
See application file for complete search history.

(56) References Cited

U.S. PATENT DOCUMENTS

| | | | | |
|---|---|---|---|---|
| 10,304,331 | B2 * | 5/2019 | Fowe | G01C 21/30 |
| 11,044,211 | B2 | 6/2021 | Liu et al. | |
| 2009/0059923 | A1 * | 3/2009 | Guo | H04L 45/48 |
| | | | | 370/390 |
| 2009/0067348 | A1 * | 3/2009 | Vasseur | H04L 45/04 |
| | | | | 370/256 |
| 2011/0235635 | A1 * | 9/2011 | Yadav | H04Q 11/0067 |
| | | | | 398/58 |
| 2018/0287935 | A1 * | 10/2018 | Wang | H04L 12/4625 |
| 2019/0068524 | A1 * | 2/2019 | Shepherd | H04L 12/184 |

(Continued)

OTHER PUBLICATIONS

Cisco Systems, Inc., "Routing Configuration Guide for vEdge Routers, Cisco SD-WAN Release 20.x", Apr. 30, 2020, 74 pages.

(Continued)

*Primary Examiner* — Kwang B Yao
*Assistant Examiner* — Bradley D Lytle, Jr.
(74) *Attorney, Agent, or Firm* — Hewlett Packard Enterprise Patent Department

(57) ABSTRACT

Examples described herein relate to a centralized overlay multicast orchestrator in a software-defined wide area network (SD-WAN). The overlay multicast orchestrator receives and maintains state information from multicast agents deployed on overlay network nodes. Based on the state information, the overlay multicast orchestrator identifies a first set of overlay network nodes connected to a source and a second set of overlay network nodes connected to hosts requesting a multicast stream. The overlay multicast orchestrator computes and distributes a multicast tree representing a path for transmission of the multicast stream to the requesting hosts.

20 Claims, 5 Drawing Sheets

300

(56) References Cited

U.S. PATENT DOCUMENTS

2020/0287732 A1 * 9/2020 Bidgoli ................. H04L 45/586
2021/0160169 A1 * 5/2021 Shen ....................... H04L 45/02

OTHER PUBLICATIONS

Citrix Systems, Inc., "Multicase Routing", available online at
<https://docs.citrix.com/en-us/citrix-sd-wan-orchestrator/site-level-
configuration/multicast-group.html>, Apr. 8, 2021, 5 pages.
Keshav et al., "Centralized multicast,", DOI: 10.1109/ICNP.1999.
801916, Jan. 1999, 19 pages.
Paul et al., "Survey of Multicast Routing Algorithms and Proto-
cols," Aug. 2002, Proceedings of the international conference on
computer communication, vol. 15, No. 3, p. 902.

* cited by examiner

300

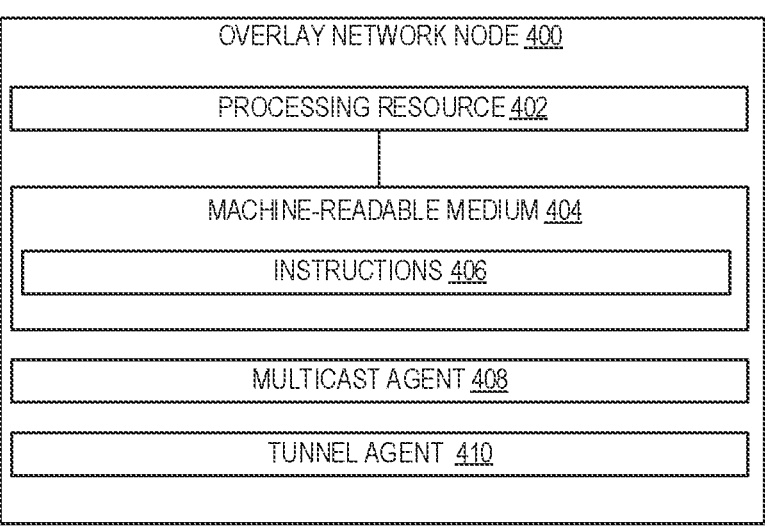

```
OVERLAY NETWORK NODE 400

PROCESSING RESOURCE 402

MACHINE-READABLE MEDIUM 404

INSTRUCTIONS 406

MULTICAST AGENT 408

TUNNEL AGENT 410
```

*FIG. 4*

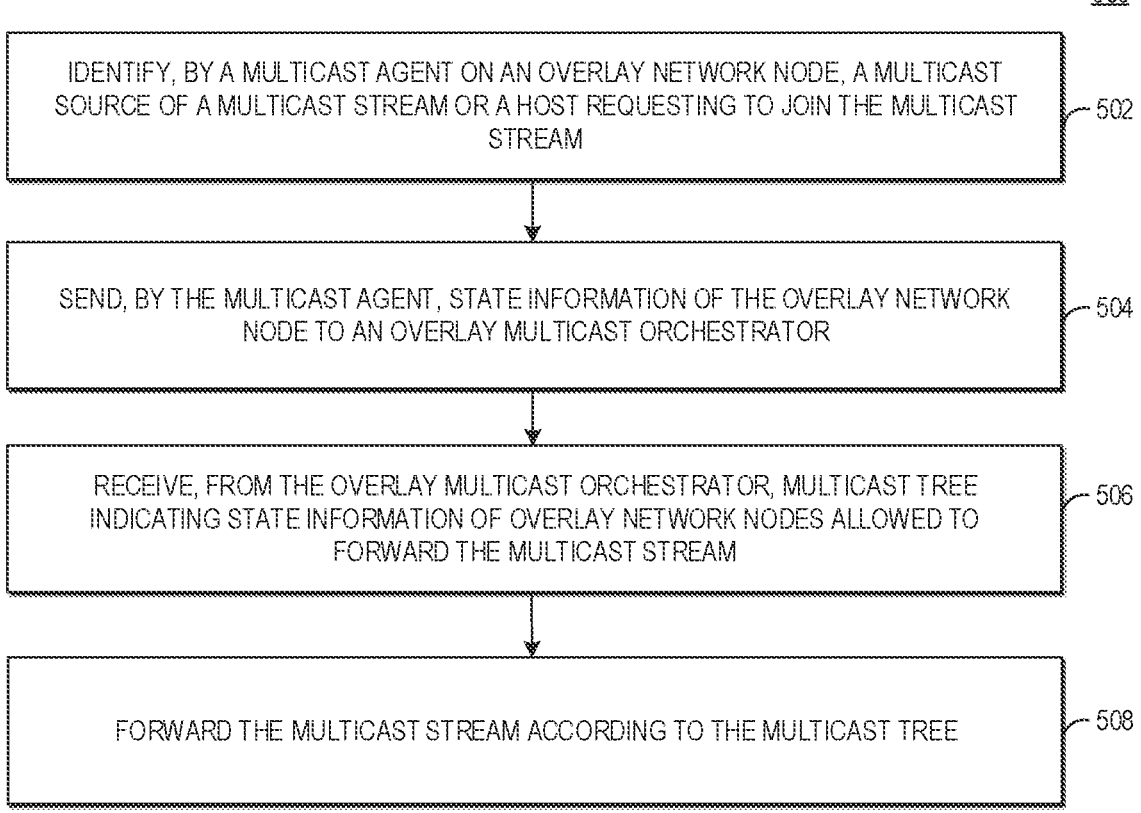

500

IDENTIFY, BY A MULTICAST AGENT ON AN OVERLAY NETWORK NODE, A MULTICAST SOURCE OF A MULTICAST STREAM OR A HOST REQUESTING TO JOIN THE MULTICAST STREAM — 502

SEND, BY THE MULTICAST AGENT, STATE INFORMATION OF THE OVERLAY NETWORK NODE TO AN OVERLAY MULTICAST ORCHESTRATOR — 504

RECEIVE, FROM THE OVERLAY MULTICAST ORCHESTRATOR, MULTICAST TREE INDICATING STATE INFORMATION OF OVERLAY NETWORK NODES ALLOWED TO FORWARD THE MULTICAST STREAM — 506

FORWARD THE MULTICAST STREAM ACCORDING TO THE MULTICAST TREE — 508

*FIG. 5*

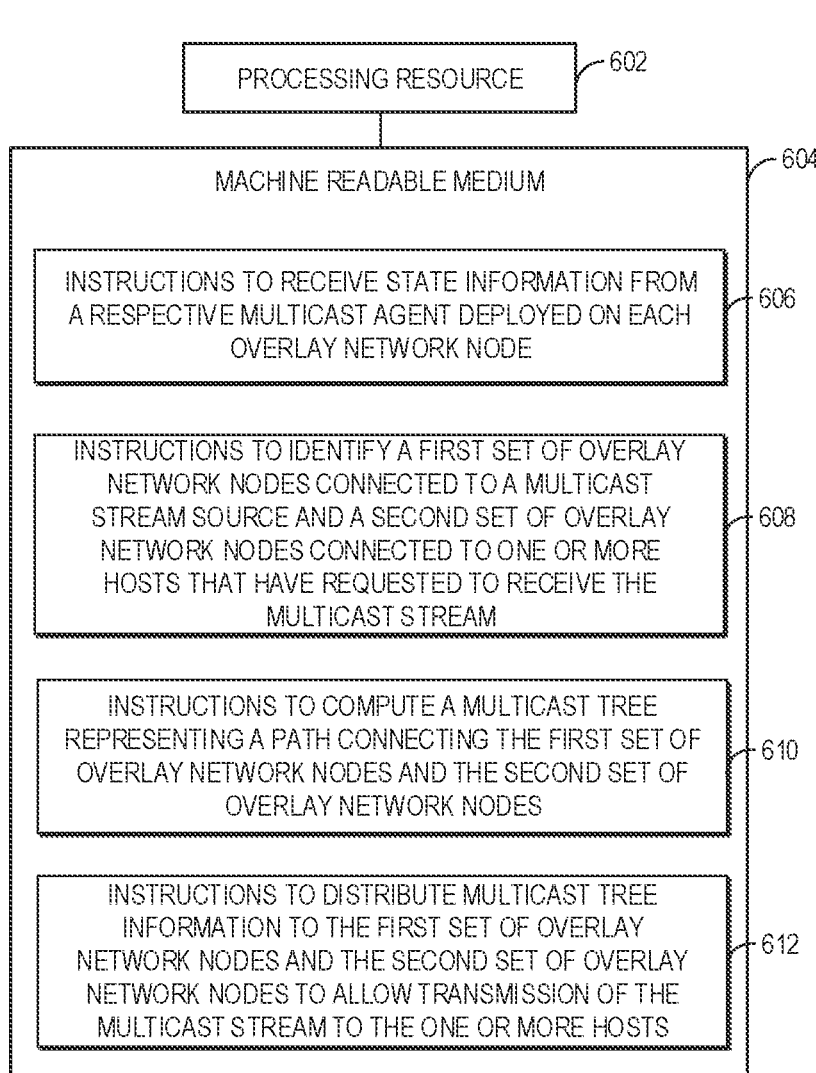

600

PROCESSING RESOURCE          602

MACHINE READABLE MEDIUM          604

INSTRUCTIONS TO RECEIVE STATE INFORMATION FROM A RESPECTIVE MULTICAST AGENT DEPLOYED ON EACH OVERLAY NETWORK NODE          606

INSTRUCTIONS TO IDENTIFY A FIRST SET OF OVERLAY NETWORK NODES CONNECTED TO A MULTICAST STREAM SOURCE AND A SECOND SET OF OVERLAY NETWORK NODES CONNECTED TO ONE OR MORE HOSTS THAT HAVE REQUESTED TO RECEIVE THE MULTICAST STREAM          608

INSTRUCTIONS TO COMPUTE A MULTICAST TREE REPRESENTING A PATH CONNECTING THE FIRST SET OF OVERLAY NETWORK NODES AND THE SECOND SET OF OVERLAY NETWORK NODES          610

INSTRUCTIONS TO DISTRIBUTE MULTICAST TREE INFORMATION TO THE FIRST SET OF OVERLAY NETWORK NODES AND THE SECOND SET OF OVERLAY NETWORK NODES TO ALLOW TRANSMISSION OF THE MULTICAST STREAM TO THE ONE OR MORE HOSTS          612

FIG. 6

OVERLAY MULTICAST ORCHESTRATION IN SOFTWARE-DEFINED WIDE AREA NETWORK

BACKGROUND

In computer networking, multicast (or a multicast stream) may generally refer to group communication where data transmission is addressed simultaneously to a group of receivers (e.g., destination hosts/computers) requesting multicast traffic. Multicast may be used for various purposes such as streaming media and other network applications, information dissemination, group communication, etc.

Associated with multicast is the concept of a multicast group. A multicast group typically has an identifier or address (i.e., the multicast group IP address) that identifies the multicast group. Members of the multicast group may join or leave the multicast group without notifying other members. Traffic sent by a member (e.g., multicast source) of a multicast group may be received by all the other members of the multicast group (e.g., receivers). Traditionally, multicast traffic is routed to multicast group members using IP routing protocols, such as Protocol Independent Multicast (PIM).

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which:

FIG. 4 is a block diagram depicting an example overlay network node that allows orchestration of multicast traffic on an overlay network within a large scale software-defined branch deployment;

FIG. 5 is a flowchart of an example method that can be performed by an overlay network node that allows orchestration of multicast traffic on an overlay network within a large scale software-defined branch deployment;

FIG. 6 is a block diagram depicting a processing resource and a machine-readable medium encoded with example instructions to orchestrate multicast traffic on an overlay network within a large scale software-defined branch deployment;

Figure 1:
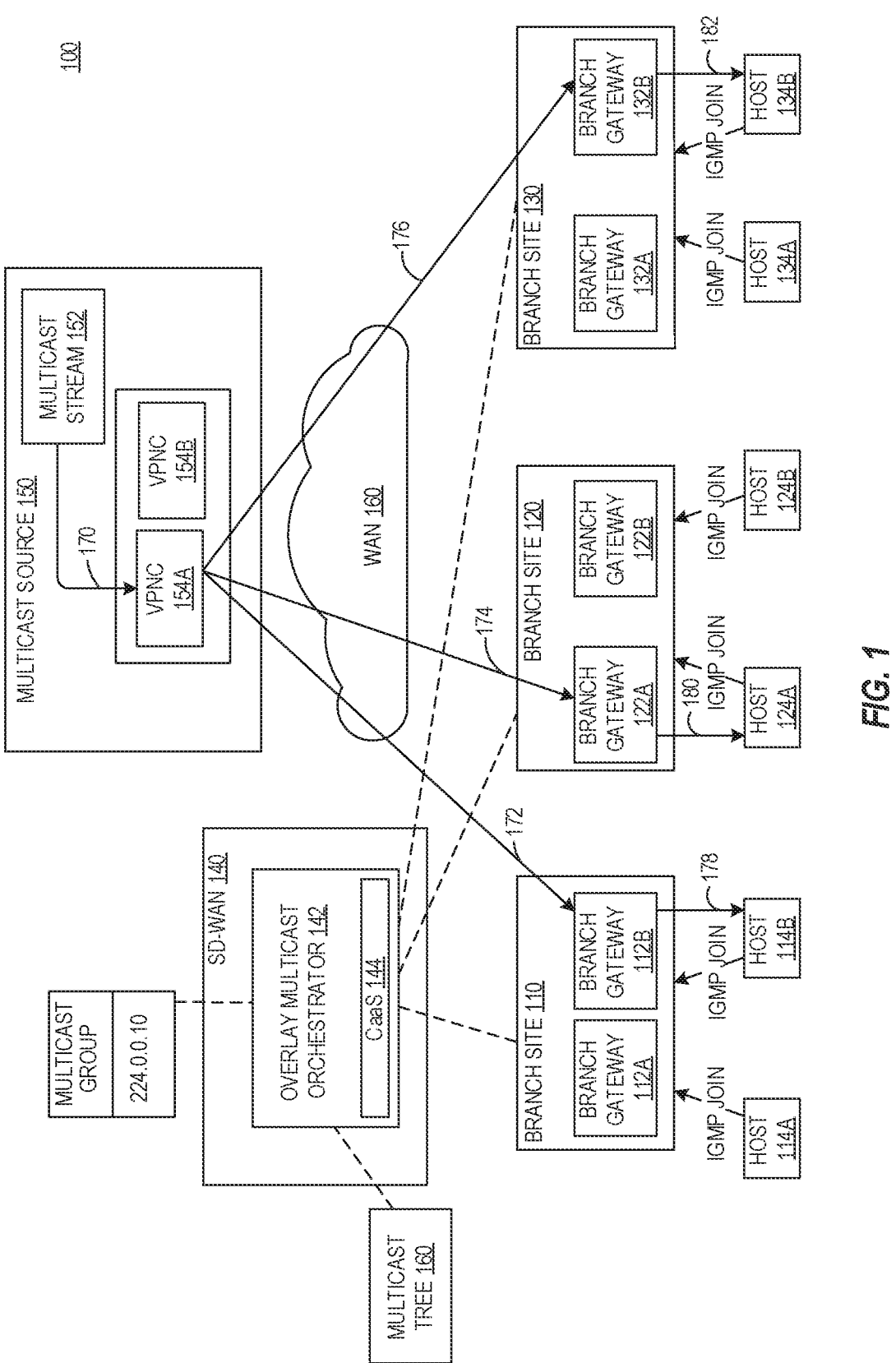
FIG. 1 is a block diagram depicting an example large scale software-defined branch deployment with overlay multicast orchestrator.

Certain examples have features that are in addition to or in lieu of the features illustrated in the above-referenced figures. Certain labels may be omitted from certain figures for the sake of clarity.

DETAILED DESCRIPTION

As described above, multicast may refer to group communication where data transmission (i.e., multicast traffic) is addressed to a group of receivers (e.g., destination hosts/computers) simultaneously.

One environment for multicast is large scale software-defined branch deployments. In large scale software-defined branch deployments, software-defined wide area network (SD-WAN) technology may be used to centralize management of an organization's wide area network (WAN) across multiple physical branch locations. Commonly implemented as a cloud-based management solution, SD-WAN technologies rely on virtualization, overlay networks, and onsite SD-WAN devices and software platforms to (among other things) better manage network traffic.

In some existing solutions, multicast implementations for large scale software-defined branch deployment use a decentralized approach, where multicast groups are setup using intermediate network nodes, such as routers, instead of a central node. In particular, these implementations have relied on variations of the same traditional—Protocol-Independent Multicast (PIM)—which has been widely used for Internet-based multicast for years. While simple to implement, PIM-based approaches do not optimize bandwidth consumption across the WAN of a large scale software-defined branch deployment. For instance, large amounts of control plane information (referred to herein as "state information") must be broadcast to a wide array of network nodes (e.g., routers, gateways, etc.) involved in the multicast transmission. In such implementations, a large number of intermediate network nodes are burdened with the task of forwarding multicast traffic (data plane information), maintaining the state information, and computing routes for a multicast group. As a result, PIM-based solutions can be resource-intensive at network nodes and difficult to monitor and troubleshoot.

Alternate solutions may leverage some centralized management capabilities of the SD-WAN technologies to delegate route computation to a central node (e.g., a controller). For instance, multicast receivers (i.e., hosts) may send requests to the central node to join (or leave) a multicast group. However, a large number (e.g., several thousands) of receivers may send requests containing state information to the central node. The central node may consume a large amount of processing and memory resources to maintain the state information associated with receivers and network nodes (e.g., routers, gateways, etc.) and to compute routes in the network. Additionally, the transfer of large amounts of state information associated with the network nodes (e.g., source VPNCs, routers, gateways, etc.) and the multicast receivers may lead to unnecessary bandwidth consumption across the WAN of such a large scale software-defined branch deployment.

In examples consistent with this disclosure, a central node and various network nodes in an overlay network are jointly tasked with multicast management functions to optimize resource consumption across large-scale software-defined branch deployments. The multicast management functions include state information maintenance and multicast table computation. State information maintenance includes collecting and storing control-plane data, such as incoming and outgoing interfaces, of multicast sources, receivers, overlay network nodes (e.g., VPNCs and branch gateways). Multicast table computation includes creating or updating a multicast table containing the state information of multicast source, receivers, and overlay network nodes of a multicast group. To reduce the burden of multicast management, the central node (referred to herein as overlay multicast orchestrator) and the overlay network nodes perform different aspects of the state information maintenance and the multicast table computation.

In some examples, the overlay network nodes maintain state information of hosts that want to join the multicast group. Each overlay network node executes a respective multicast agent, which maintains the state information. For example, the multicast agent in some of the overlay network nodes (e.g., branch gateways) may identify hosts that are requesting to join a multicast group, and in other overlay network nodes (e.g., VPNCs) may identify multicast source(s) of the multicast group. A branch gateway at a branch site maintains the state information of the identified hosts of that particular branch site, and the VPNC(s) at a core site maintains the state information of the identified multicast source. Using the multicast agents, the branch gateways and the VPNC(s) may send their respective state information to the overlay multicast orchestrator. By communicating the state information of overlay network nodes (and not the state information of myriads of hosts/sources) in this manner, the amount of bandwidth consumed may be significantly reduced across the network.

The overlay multicast orchestrator receives and maintains the state information of the overlay network nodes that are to forward the multicast stream. By maintaining the state information of the overlay network nodes and not that of the hosts/sources, the overlay multicast orchestrator may achieve significant savings in storage and memory resources. The overlay multicast orchestrator creates a multicast table indicating the state information of such overlay network nodes and transmits the multicast table to the overlay network nodes.

Each overlay network node updates the multicast table by incorporating the state information of the hosts or multicast source maintained at that overlay network node. The overlay network nodes do not have to compute multicast tables based on state information of other overlay network nodes, but merely include the state information of hosts/source to update the multicast table. This reduces the burden of computing the entire multicast table or tree in the overlay network nodes. When the multicast source begins the multicast stream, each overlay network node forwards the multicast stream according to the updated multicast table at the overlay network node.

Examples of this disclosure improve the technical field of multicast traffic transmission, specifically in the sub-field of overlay networks in large scale software-defined branch deployment. The technical improvements are achieved in the overlay multicast orchestrator (e.g., controllers, servers, etc.), network nodes (e.g., branch gateways or VPNCs), and overlay networks in SD-WAN. Examples of this disclosure improve such devices by, among other things, reducing resource consumption (e.g., processing or memory) at the overlay multicast orchestrator and other network nodes, reducing overall bandwidth consumption in the SD-WAN network, etc.

FIG. 1 depicts an example large scale software-defined branch deployment with an overlay multicast orchestrator, in accordance with various examples of the presently disclosed technology. Large scale software-defined branch deployment 100 includes three branch/customer sites (sites 110, 120, and 130), an SD-WAN 140, and a multicast source 150. Traffic may be carried between the branches, the SD-WAN 140, and the multicast source 150 via a wide area network (WAN) 160.

The SD-WAN 140 may be a cloud-based SD-WAN technology platform, which includes a centralized entity capable of orchestrating multicast-related traffic within a given WAN (e.g., WAN 160). The centralized entity is cloud-based multicast orchestrator 142 (referred to herein as overlay multicast orchestrator 142), which is a central management node to orchestrate multicast traffic between the multicast source 150 and the branches 110-130.

The multicast source 150 may be any source of a multicast stream. In some examples, the multicast source 150 may be a datacenter. The multicast stream 152 may be any data transmission (e.g., streaming media, information dissemination, etc.) originating from a server in the datacenter and addressed to a group of receivers (e.g., hosts) simultaneously. In examples described herein, a multicast stream may be associated with a multicast group. A multicast group may include at least (a) the source of the multicast stream, and (b) receivers of the multicast stream as members. As depicted, the multicast stream 152 is associated with multicast group 224.0.0.10. Here, "224.0.0.10" may be an IP address for multicast group 224.0.0.10. As depicted in FIG. 1, the multicast stream 152 is connected to (i.e., behind) two virtual private network concentrators (VPNCs) 154A and 154B. In general, a VPNC may refer to a hardware or a software application used for connecting Virtual Private Networks (VPNs). As depicted, the multicast stream 152 is associated with the VPNC 154A. Accordingly, the multicast source 150 may transmit multicast traffic associated with the multicast stream 152 via the VPNC 154A to one or more of the branches 110-130 using the SD-WAN 140.

A branch may refer to a physical location at which one or more hosts (e.g., computers or other network devices associated with a user) may connect to the WAN 160. For example, a branch may be a remote office of an organization, a café/coffee shop, a home office, etc. The various network devices (e.g., hosts, branch gateways, routers, etc.) of a given branch may communicate with each other over the branch's local area network (LAN). A branch gateway may refer to a network device (hardware or software) that transfers traffic between a branch and other networks. For example, the branch gateways 112A, 112B, 122A, 122B, 132A, and 132B depicted in the example figure may transfer traffic between WAN 160 and the various network devices of their branch (e.g., other branch gateways, hosts, etc.). A host may be a network device (e.g., a computer, tablet, smartphone, etc.) operated by a user located at a branch. A given host may be connected to (i.e., "behind") one branch gateway (here, any number of hosts may be behind the branch gateway). As depicted, host 114A is behind branch gateway 112A; host 114B is behind branch gateway 112B; host 124A is behind branch gateway 122A; host 124B is behind branch gateway 122B; host 134 A is behind branch gateway 132A; and host 134B is behind branch gateway 132B.

To orchestrate multicast traffic between the multicast source 150 and the branches 110-130, the overlay multicast orchestrator 142 must understand aspects of network topology/configuration. Among other items, the overlay multicast orchestrator 142 uses state information of overlay network nodes, which include (1) branch gateways that are connected to hosts requesting to receive a given multicast stream, and (2) VPNCs that receive and forward a given multicast stream from a multicast source. The state information of an overlay network node may include respective control-plane information including one or more of incoming and outgoing interfaces, a multicast group identifier, a local area network identifier, or a multicast source identifier.

To obtain the state information, the overlay multicast orchestrator 142 may implement additional centralized network management services. In some examples, the overlay multicast orchestrator 142 includes services, such as Containers-as-a-Service (CaaS), tunnel and route orchestrators (as described in relation to FIG. 2) to allow centralized orchestration of multicast-related traffic.

A CaaS 144 may include a container orchestration service that runs and maintains infrastructure between an organization's clusters. In examples described herein, CaaS 144 automates management of containers, microservices, or workloads that when executed perform operations to enable retrieval of state information from branch sites 110, 120, 130 and multicast source 150 to the SD-WAN 140. In some examples, the CaaS 144 may obtain the state information of the overlay network nodes. For example, the CaaS 144 may ping multicast agents (not shown in FIG. 1) deployed on the overlay network nodes, i.e., branch gateway(s) and VPNCs, to obtain their respective state information.

The multicast agents in the overlay network nodes may maintain state information of hosts or multicast source. For example, in the case of branch gateways, when a branch gateway receives "join request" messages from a host, the multicast agents may store the state information of that host. A "join request" message is a request from a host to join a multicast group. A join request message includes identity of the host (e.g., IP address) and a multicast group identifier of the multicast group that the host wants to join. In certain examples, this join request message may be sent using an Internet Group Management Protocol (IGMP), which is a communications protocol used by hosts to establish multicast group memberships. For example, host 134B may not yet be a member of multicast group 224.0.0.10. Accordingly, host 134B may send an IGMP join request message to branch gateway 132B. The multicast agent on the branch gateway may store the state information of the host 134B. In the case of VPNCs, the multicast agents on VPNCs may determine a connection to a multicast source and maintain state information of the multicast source 150. For example, multicast agent on VPNC 154A may determine that the VPNC is connected to multicast source 150 and store the state information of the multicast source 150.

Although, the multicast agents maintain state information of hosts or multicast source, they do not share such state information with other devices. For example, the CaaS 144 may communicate with the multicast agents on the overlay network nodes and obtain state information of the overlay network nodes (branch gateways and VPNCs) but not the state information of the hosts or multicast source 150. The state information of the overlay network nodes may include, among other things, incoming and outgoing interfaces (e.g., tunnel information) of the overlay network nodes and multicast source identifier. For example, the multicast agent on branch gateway 132B may provide the incoming and outgoing interfaces of the branch gateway 132B and multicast source identifier (224.0.0.10). Similarly, the multicast agent on VPNC 154A may send the incoming and outgoing interfaces of the VPNC 154A and multicast source identifier (224.0.0.10). By collecting the state information of only the overlay network nodes in this manner, WAN bandwidth consumption may be significantly reduced.

After receiving the state information of the overlay network nodes, the overlay multicast orchestrator 142 may now be aware of (1) which branch gateways may have received requests from hosts, and (2) which VPNCs are connected to a given multicast source. The overlay multicast orchestrator 142 may compute a multicast tree 160 using the state information of such VPNCs and branch gateways. The overlay multicast orchestrator 142 computes multicast tree without the state information of hosts or sources. The multicast tree may be represented by a multicast table, which specifies the state information of the VPNCs and the branch gateway. Table 1 is an example multicast table specifying incoming and outgoing interfaces of VPNC or branch gateway (BG), a multicast source identifier, and the multicast group identifier for the given multicast stream. In one example, the multicast source identifier may be "217.160.67.6", which may be the IP address of multicast source 150. The multicast group identifier may be "224.0.0.10". Although not depicted, the multicast table may also include VLAN identifiers as part of the state information.

TABLE 1

| Multicast table for multicast stream 152 | | | | |
| --- | --- | --- | --- | --- |
| Network node | Incoming interface | Outgoing interface | Multicast group identifier | Multicast source identifier |
| VPNC 154A | Tunnel 170 | Tunnel 172, 174, 176 | 224.0.0.10 | 217.160.67.6 |
| BG 112B | Tunnel 172 | — | 224.0.0.10 | 217.160.67.6 |
| BG 122A | Tunnel 174 | — | 224.0.0.10 | 217.160.67.6 |
| BG 132B | Tunnel 176 | — | 224.0.0.10 | 217.160.67.6 |

In the above example, the outgoing interface of the branch gateways may not be specified in the multicast table as the overlay network orchestrator 142 does not maintain the state information of the hosts.

The overlay network orchestrator may distribute the multicast table to the overlay network nodes (VPNC 154A, branch gateways 112B, 122A, 132B). In some examples, multicast agents deployed on each overlay network node may update the multicast table to include the state information of the hosts. For example, the multicast agent on the branch gateway 112B (connected to host 114B) may update the multicast table by including the host identifier and associated interface information of the host 114B in the multicast table. Table 2 depicts the multicast table updated at the branch gateway 112B. As depicted, host 114B and its incoming interface (tunnel 178) are included in the multicast table. Tunnel 178 is also included as the outgoing interface of the branch gateway 112B.

TABLE 2

| Updated multicast table for multicast stream 152 | | | | |
| --- | --- | --- | --- | --- |
| Network node | Incoming interface | Outgoing interface | Multicast group identifier | Multicast source identifier |
| VPNC 154A | Tunnel 170 | Tunnel 172, 174, 176 | 224.0.0.10 | 217.160.67.6 |
| BG 112B | Tunnel 172 | Tunnel 178 | 224.0.0.10 | 217.160.67.6 |
| BG 122A | Tunnel 174 | — | 224.0.0.10 | 217.160.67.6 |
| BG 132B | Tunnel 176 | — | 224.0.0.10 | 217.160.67.6 |
| Host 114B | Tunnel 178 | — | 224.0.0.10 | 217.160.67.6 |

Likewise, the multicast agent on the branch gateway 122A updates the multicast table. Table 3 depicts an updated multicast table, which includes the host 124A and its incoming interface tunnel 180. Tunnel 180 is also the outgoing interface for the branch gateway 122A.

TABLE 3

Updated multicast table for multicast stream 152

| Network node | Incoming interface | Outgoing interface | Multicast group identifier | Multicast source identifier |
|---|---|---|---|---|
| VPNC 154A | Tunnel 170 | Tunnel 172, 174, 176 | 224.0.0.10 | 217.160.67.6 |
| BG 112B | Tunnel 172 | — | 224.0.0.10 | 217.160.67.6 |
| BG 122A | Tunnel 174 | Tunnel 180 | 224.0.0.10 | 217.160.67.6 |
| BG 132B | Tunnel 176 | — | 224.0.0.10 | 217.160.67.6 |
| Host 124A | Tunnel 180 | | 224.0.0.10 | 217.160.67.6 |

Further, the multicast agent on the branch gateway 132B updates the multicast table. Table 4 depicts an updated multicast table, which includes the host 134B and its incoming interface tunnel 182. Tunnel 182 is also the outgoing interface for the branch gateway 132B.

TABLE 4

Updated multicast table for multicast stream 152

| Network node | Incoming interface | Outgoing interface | Multicast group identifier | Multicast source identifier |
|---|---|---|---|---|
| VPNC 154A | Tunnel 170 | Tunnel 172, 174, 176 | 224.0.0.10 | 217.160.67.6 |
| BG 112B | Tunnel 172 | — | 224.0.0.10 | 217.160.67.6 |
| BG 122A | Tunnel 174 | — | 224.0.0.10 | 217.160.67.6 |
| BG 132B | Tunnel 176 | Tunnel 182 | 224.0.0.10 | 217.160.67.6 |
| Host 132B | Tunnel 182 | | 224.0.0.10 | 217.160.67.6 |

In some examples, if a branch gateway receives a "leave request" from a host to leave the multicast group, then the multicast agent on the branch gateway may remove the state information of the host from the multicast table. For example, if branch gateway 132B receives a leave request to leave multicast group 224.0.0.10, then the multicast agent may remove the host identifier "HOST 132B", incoming interface ("Tunnel 182"), multicast group identifier ("224.0.0.10"), and multicast source identifier ("217.160.67.6") from the multicast table (i.e., above Table 4). By including or removing the state information of hosts in the multicast table at branch gateways, the overlay multicast orchestrator 142 may not have to retrieve state information of the hosts for multicast tree computation.

The overlay multicast orchestrator 142 may orchestrate tunnels between those VPNC and branch gateways for the given multicast stream according to the multicast table. For example, the overlay multicast orchestrator 142 may establish tunnels 170, 172, 174, 176, 178, 180, and 182 between the VPNC 154A, branch gateways (BG) 112B, 122A, 132B, hosts 114B, 124A, 134B. In particular, the overlay multicast orchestrator 142 may orchestrate: one tunnel 172 between the VPNC 154A and branch gateway 112B, one tunnel 174 between the VPNC 154A and the branch gateway 122A; one tunnel 176 between VPNC 154A and branch gateway 132B; one tunnel 178 between the branch gateway 112B and host 114B, one tunnel 180 between the branch gateway 122A and the host 124A; and one tunnel 182 between the branch gateway 132B and the host 134B.

When the VPNC 154A receives multicast traffic from the multicast source 150, the multicast traffic is forwarded to the branch gateways 1128, 122A, and 132B via the established tunnels 172, 174, and 176, respectively. Further, the branch gateways 112B, 122A, and 132B may forward the multicast traffic to hosts 114B, 124A, and 134B, respectively.

As will be appreciated, the overlay multicast orchestrator 142 may collect the state information of only the overlay network nodes (and not that of hosts or multicast sources) to compute multicast tables such that WAN bandwidth consumption is significantly reduced. Said differently, centralized decision-making within overlay multicast orchestrator 142 greatly reduces the number of communications and amount of state information required to transmit multicast traffic within a large scale software-defined branch deployment. As described above, under the decentralized approach used by existing technologies, much of the aforementioned information would be communicated among the various nodes (e.g., routers, branch gateways, VPNCs) of a network tasked with transmitting multicast traffic. Further, the centralized approaches of existing technologies involve the transmission of information associated with hosts or receivers to a central entity. Such existing implementations consume WAN bandwidth and resources of the central entity for maintenance purposes. Additionally, the overlay multicast orchestrator may store state information of only the overlay network nodes which allow significant savings in storage or memory resources. Further, the overlay network nodes may not have to compute multicast tree and reduce consumption of processing resources unlike the traditional decentralized approaches for multicast implementations.

Figure 2:
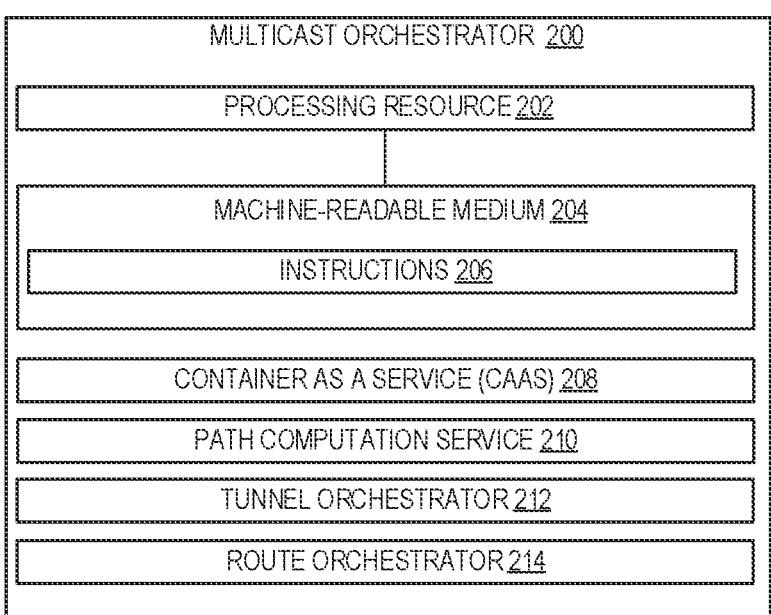
FIG. 2 is a block diagram depicting an example overlay multicast orchestrator that orchestrates multicast traffic on an overlay network within a large scale software-defined branch deployment.

FIG. 2 is a block diagram of an example overlay multicast orchestrator that orchestrates multicast traffic on an overlay network within a large scale software-defined branch deployment.

The overlay multicast orchestrator 200 may include a processing resource 202, a machine-readable medium 204 storing (e.g., encoded with) instructions 206, container as a service 208, a path computation service 210, a tunnel orchestrator 212, and a route orchestrator 214. The instructions 206 may include steps to initiate the various functions of the CaaS 208, the path computation service 210, the tunnel orchestrator 212, and the route orchestrator 214. In some examples, functionalities described in relation to the CaaS 208, the path computation service 210, the tunnel orchestrator 212, and the route orchestrator 214 may be implemented by a combination of hardware and programming.

The processing resource 202 may execute the CaaS 210 to obtain the state information from multicast agents deployed on each of the overlay network nodes. The state information of the overlay network node may include an incoming interface to receive a multicast stream and an outgoing interface to forward the multicast stream. In some examples, the state information may also include one or more of a local area network identifier, a multicast group identifier (e.g., IP address), or a multicast source identifier. The multicast group identifier indicates the multicast group associated with the multicast stream to be forwarded by the overlay network node. The CaaS 210 may identify a subset of the overlay network nodes that are associated with a given multicast stream based on the multicast group identifier. From the subset of overlay network nodes, the CaaS 210 may identify VPNCs that are associated with a first local area network identifier (e.g., of a datacenter) and branch gateways that are associated with a second local area network identifier (e.g., a branch site).

The processing resource 202 may execute the path computation service 208 to analyze the state information (i.e., incoming and outgoing interfaces, LAN identifier, multicast group identifier, multicast source identifier) for associated VPNCs and branch gateways. The processing resource 202 may create a multicast table based on the outgoing interface and incoming interface, the LAN identifier, and the multicast group identifier. The multicast table corresponds to the multicast tree and specifies the state information of the overlay network nodes (VPNCs, branch gateways) in the multicast group.

In some examples, the processing resource 202 may execute the tunnel orchestrator 212 to receive link information from a respective tunnel agent deployed on each of the overlay network nodes. The link information includes a link type and a service provider tag associated with each of the overlay network nodes. The link type may refer to uplink type (e.g., Multi-Protocol Label Switching (MPLS), Metro, Long-Term Evolution (LTE) and the service provider tag may identify the service provider for that uplink. The tunnel orchestrator 212 may create tunnels between two overlay network nodes based on a match between the respective link type and respective service provider tag of the overlay network nodes.

In some examples, the processing resource 202 may execute the route orchestrator 214 to calculate routes for multicast traffic based on the aforementioned multicast tree. In certain of these examples, the route orchestrator 214 may learn to calculate optimal routes for reducing bandwidth consumption for the WAN 160. For example, the route orchestrator 214 may employ artificial intelligence (AI) or machine learning to determine overlay tunnels for multicast traffic between VPNCs and branch gateways based on traffic requirements and historical data.

In other examples, overlay multicast orchestrator 142 may take advantage of routes that have already been calculated by SD-WAN 140 (and/or its subservices). Existing SD-WAN services typically calculate routes for unicast traffic between VPNCs and branch gateways. Accordingly, the overlay multicast orchestrator 142 may orchestrate multicast traffic through these pre-calculated routes. By leveraging existing SD-WAN knowledge and services, the overlay multicast orchestrator 142 can enhance its multicast orchestration service without consuming significant additional WAN bandwidth, cloud resources, etc.

Figure 3:
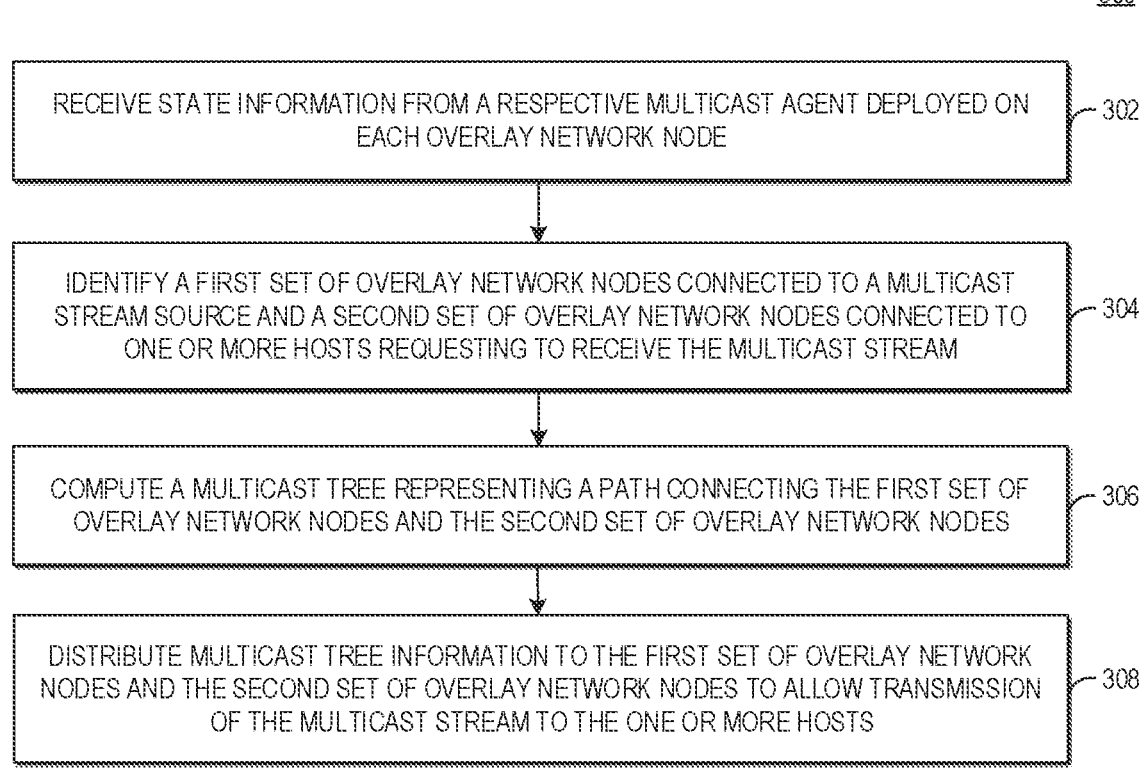
FIG. 3 is a flowchart of an example method that can be performed by an overlay multicast orchestrator to orchestrate multicast traffic on an overlay network within a large scale software-defined branch deployment.

FIG. 3 is a flowchart depicting an example method that can be performed by an overlay multicast orchestrator.

At block 302, method 300 includes receiving state information from a respective multicast agent deployed on each overlay network node. The state information of the overlay network node may include an incoming interface to receive a multicast stream and an outgoing interface to forward the multicast stream. In some examples, the state information may also include one or more of a local area network identifier, a multicast group identifier or address 224.0.0.10 (e.g., IP address), or a multicast source identifier from the multicast agent.

At block 304, method 300 includes identifying, based on the state information, a first set of overlay network nodes connected to a multicast stream source and a second set of overlay network nodes connected to one or more hosts requesting to receive the multicast stream. The first set of overlay network nodes refers to one or more VPNCs connected directly or indirectly (e.g., via one or more other VPNCs) to the multicast source. The second set of overlay network nodes refers to one or more branch gateways that can forward the multicast stream to the requesting hosts. In some examples, method 300 includes identifying the first and second set of overlay network nodes based on multicast group identifier and LAN identifiers. For example, method includes identifying a subset of the overlay network nodes that are associated with a given multicast stream based on the multicast group identifier. From the subset of overlay network nodes, method includes identifying VPNCs that are associated with a first local area network identifier (e.g., of a datacenter) and branch gateways that are associated with a second local area network identifier (e.g., a branch site).

At block 306, method 300 includes computing a multicast tree representing a path connecting the first set of overlay network nodes (VPNCs) and the second set of overlay network nodes (branch gateways). Method includes creating a multicast table based on the outgoing interface and incoming interface, the LAN identifier, and the multicast group identifier. The multicast table corresponds to the multicast tree and specifies the state information of the overlay network nodes (VPNCs, branch gateways) in the multicast group.

At block 308, method 300 includes distributing the multicast tree to the first set of overlay network nodes and the second set of overlay network nodes. When the multicast source starts streaming multicast traffic, the overlay network nodes receive and forward the multicast traffic according to the multicast tree.

FIG. 4 is a block diagram of an example overlay network node that allows centralized orchestration of multicast traffic on an overlay network within a large scale software-defined branch deployment.

As depicted in FIG. 4, the overlay network node 400 may include a processing resource 402, a machine-readable medium 404 storing (e.g., encoded with) instructions 406, a multicast agent 408, and a tunnel agent 410. The overlay network node 400 may be a VPNC or a branch gateway. The instructions 406 may include steps to initiate the various functions of the multicast agent 408 and the tunnel agent 410. In some examples, functionalities described in relation to the multicast agent 408 and the tunnel agent 410 may be implemented by a combination of hardware and programming.

The multicast agent 408 identifies a multicast source of a multicast stream or one or more hosts that have requested to join the multicast stream. For example, a multicast agent 408, at a VPNC, may identify which multicast sources are sending multicast streams via the VPNCs. At a branch gateway, the multicast agent 408 may identify the one or more hosts that are requesting the multicast stream based on join requests received from the one or more hosts. The join request may be an IGMP request, for example. The join request includes a multicast group identifier of a multicast group associated with a multicast stream. In some examples, when a branch gateway receives at least one join request for the multicast stream, the multicast agent on the branch gateway will send the state information of the branch gateway to the overlay multicast orchestrator 142.

The multicast agent 408 may send state information of the overlay network node to an overlay multicast orchestrator. The state information of the overlay network node may include one or more of incoming and outgoing interfaces, a LAN identifier, a multicast group identifier, or a multicast source identifier. The multicast agent 408 does not send state information associated with hosts to the overlay multicast orchestrator. As a result, the amount of control-plane information transmitted to and maintained at the overlay orchestrator is reduced. The overlay multicast orchestrator also receives state information from VPNCs associated with the multicast stream, and computes a multicast tree based on the state information of the VPNCs and the branch gateways.

The multicast agent 408 may receive the multicast tree from the overlay multicast orchestrator. The multicast tree may be represented as a table containing the state information of the overlay network nodes that forward the multicast stream. At the branch gateways, the multicast agent 408 updates the multicast table by including state information of the one or more hosts requesting the multicast stream.

In some examples, the tunnel agents 410 on the overlay network nodes send link information to the overlay multicast orchestrator. The link information includes a link type and a service provider tag associated with each of the overlay network nodes. The link type may refer to uplink type (e.g., MPLS, Metro, LTE and the service provider tag may identify the service provider for that uplink. The overlay multicast orchestrator may create tunnels between the overlay network nodes based on a match between the respective link type and respective service provider tag of the overlay network nodes. The overlay network nodes may forward the multicast stream from the multicast source according to the updated multicast tree.

FIG. 5 is a flowchart depicting an example method performed by an overlay network node that allows orchestration of multicast traffic on an overlay network.

At block 502, method 500 includes identifying a multicast source of a multicast stream or one or more hosts that have requested to join the multicast stream. For example, at a VPNC, method includes identifying which multicast sources are sending multicast streams via the VPNC. At a branch gateway, method includes identifying the one or more hosts based on join requests received from the one or more hosts. For example, the join request may be an IGMP request. The join request includes a multicast group identifier of a multicast group associated with a multicast stream.

At block 504, method includes sending state information of the overlay network node to an overlay multicast orchestrator. The state information of the overlay network node may include one or more of incoming and outgoing interfaces, a LAN identifier, a multicast group identifier, or a multicast source identifier. The overlay network node does not send state information associated with hosts to the overlay multicast orchestrator. As a result, the amount of control plane information transmitted to and maintained at the overlay orchestrator is reduced. The overlay multicast orchestrator also receives state information from VPNCs associated with the multicast stream and computes a multicast tree based on the state information of the VPNCs and the branch gateways.

At block 506, method includes receiving, from the overlay multicast orchestrator, the multicast tree to allow transmission of the multicast stream across overlay network nodes. At block 508, method includes forwarding multicast stream from multicast source according to the multicast tree.

FIG. 6 is a block diagram illustrating a processing resource 602 and a machine-readable medium 604 encoded with example instructions 606-612 to orchestrate multicast traffic within a large scale software-defined branch deployment.

The instructions 606, when executed, may cause the processing resource 602 to receive state information from a respective multicast agent deployed on each overlay network node. The instructions 608, when executed, may cause the processing resource 602 to identify a first set of overlay network nodes connected to a multicast stream source and a second set of overlay network nodes connected to one or more hosts requesting to receive the multicast stream. The instructions 610, when executed, may cause the processing resource 602 to compute a multicast tree representing a path connecting the first set of overlay network nodes and the second set of overlay network nodes. The instructions 612, when executed, may cause the processing resource 602 to distribute the multicast tree to the first set of overlay network nodes and the second set of overlay network nodes to allow transmission of the multicast stream to the one or more hosts.

Figure 7:
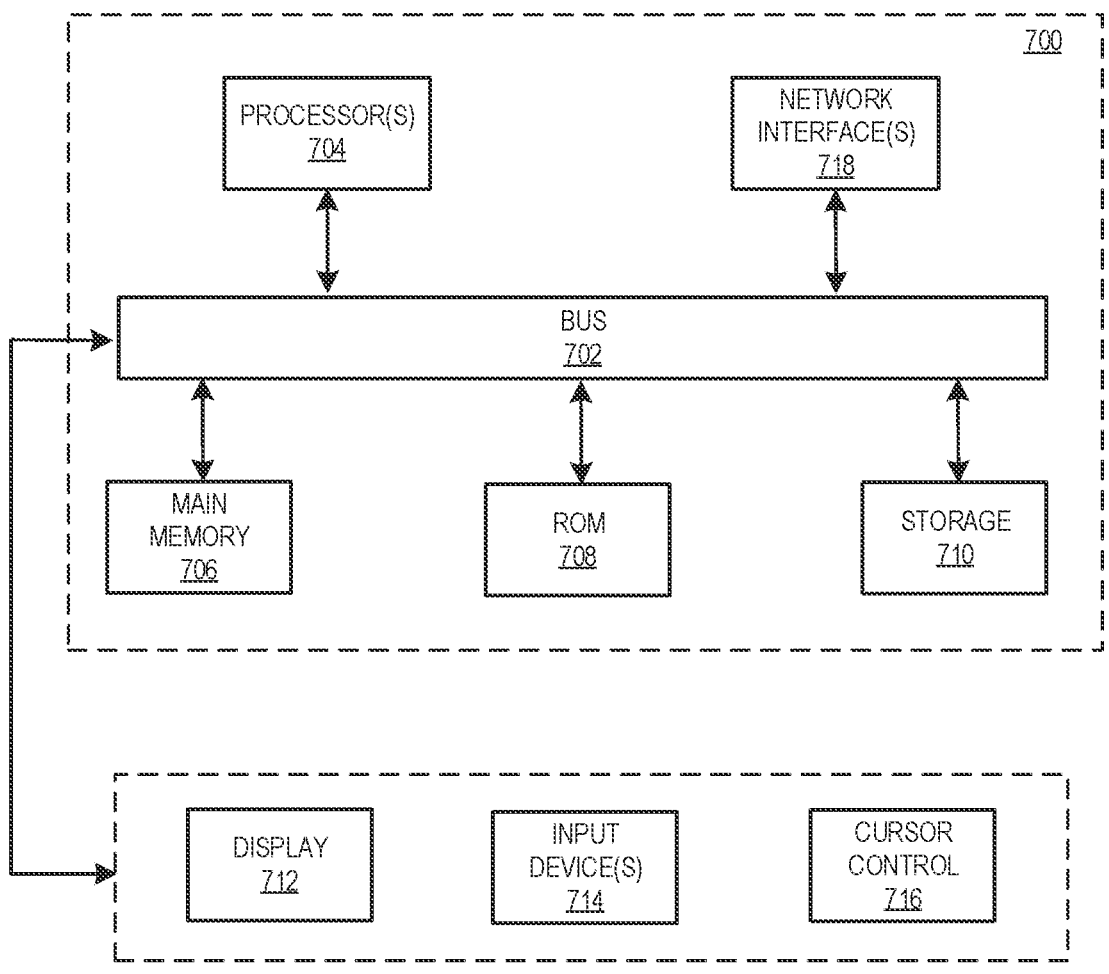
FIG. 7 is an example computing component that may be used to implement various features of embodiments described in the present disclosure.

FIG. 7 is a block diagram depicting an example computer system 700 in which various embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read-only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer-readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 806. Common forms of non-transitory media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP in turn provides data communication services through the world wide packet data communication network now commonly referred to as the "Internet." Local network and the Internet both use electrical, electromagnetic, or optical signals that carry digital data streams. The signals through the various networks and the signals on the network link and through communication interface 718, which carry the digital data to and from computer system 700, are example of forms of transmission media.

The computer system 700 can send messages and receive data, including program code, through the network(s), network link, and communication interface 718. In the Internet example, a server might transmit a requested code for an application program through the Internet, the ISP, the local network, and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support the performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines, or other mechanisms might be implemented to make up a circuit. In an implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

What is claimed is:

1. A method comprising:

receiving, by a multicast orchestrator in a software-defined wide area network (SD-WAN) comprising overlay network nodes, state information from the overlay network nodes;

based on the state information, identifying, by the multicast orchestrator from the overlay network nodes, a first overlay network node connected to a multicast source of a multicast stream and a second overlay network node connected to a host, wherein the second overlay network node comprises a first interface connected to the first overlay network node and a second interface connected to the host;

based on the identifying, computing, by the multicast orchestrator, a partially populated multicast table representing a multicast tree comprising a path connecting the first overlay network node and the second overlay network node, the partially populated multicast table comprising:

a first entry identifying respective interfaces of the first overlay network node connected to the multicast source and the second overlay network node, and a partially populated second entry comprising a populated first interface field identifying the first interface connected to the first overlay network node, and an empty second interface field that is without information identifying the second interface connected to the host;

distributing, by the multicast orchestrator, the partially populated multicast table to the first and second overlay network nodes to allow transmission of the multicast stream to the host; and updating, by the second overlay network node, the partially populated second entry of the partially populated multicast table received from the multicast orchestrator at the second overlay network node by adding, to the empty second interface field, the information identifying the second interface connected to the host.

2. The method of claim 1, wherein the first overlay network node includes a virtual private network concentrator (VNPC), and the second overlay network node includes a branch gateway.

3. The method of claim 1, wherein the host is a first host, the method further comprising:

identifying, by the multicast orchestrator, a third overlay network node connected to a second host, wherein the multicast tree comprises paths connecting the first overlay network node and the second and third overlay network nodes, and wherein the partially populated multicast table further comprises a partially populated third entry comprising a populated first interface field identifying a first interface of the third overlay network node connected to the first overlay network node, and an empty second interface field that is without information identifying a second interface of the third overlay network node connected to the second host;

distributing, by the multicast orchestrator, the partially populated multicast table to the third overlay network node; and updating, by the third overlay network node, the partially populated third entry of the partially populated multicast table received at the third overlay network node by adding, to the empty second interface field of the partially populated third entry, the information identifying the second interface of the third overlay network node connected to the second host.

4. The method of claim 1, wherein the partially populated second entry of the partially populated multicast table further comprises a multicast source identifier of the multicast source, and a multicast group identifier of a multicast group associated with the multicast stream.

5. The method of claim 1, wherein the identifying of the first overlay network node comprises:

selecting, by the multicast orchestrator, a subset of overlay network nodes associated with a first multicast group identifier; and identifying, by the multicast orchestrator from the subset of overlay network nodes, the first overlay network node that is associated with a first local area network identifier, wherein the first local area network identifier is associated with a core site.

6. The method of claim 5, wherein the identifying of the second overlay network node comprises:

identifying, by the multicast orchestrator from the subset of overlay network nodes, the second overlay network node that is associated with a second local area network identifier, wherein the second local area network identifier is associated with a customer site.

7. The method of claim 1, wherein the computing of the partially populated multicast table comprises:

including, in the populated first interface field, information identifying the first interface of the second overlay network node; and not including, in the empty second interface field, the information identifying the second interface of the second overlay network node.

8. The method of claim 7, wherein the information identifying the first interface comprises information of a tunnel between the second overlay network node and the first overlay network node, and the information identifying the second interface comprises information of a link between the second overlay network node and the host.

9. A first overlay network node of a software-defined network, comprising:

a processing resource comprising one or more processors; and a non-transitory machine-readable medium storing instructions executable by the processing resource to:

identify a host seeking to join a multicast stream;

send state information of the first overlay network node to a multicast orchestrator;

receive, at the first overlay network node from the multicast orchestrator, a partially populated multicast table comprising state information of overlay network nodes allowed to forward the multicast stream, wherein the partially populated multicast table comprises:

a first entry identifying respective interfaces of a second overlay network node connected to a multicast source of the multicast stream and the first overlay network node, and a partially populated second entry for the first overlay network node, the partially populated second entry comprising a populated first interface field containing information of a first interface of the first overlay network node, and an empty second interface field that is without information of a second interface of the first overlay network node, the first interface connected to the second overlay network node, and the second interface connected to the host;

update, at the first overlay network node, the partially populated second entry of the partially populated multicast table to form an updated multicast table by adding, to the empty second interface field, the information of the second interface of the first overlay network node;

forward the multicast stream according to the updated multicast table.

10. The first overlay network node of claim 9, wherein the partially populated second entry of the partially populated multicast table further comprises a multicast group identifier for the multicast stream.

11. The first overlay network node of claim 9, wherein the partially populated multicast table further comprises a partially populated third entry for a third overlay network node connected between a further host and the second overlay network node, the partially populated third entry comprising a populated first interface field containing information of a first interface of the third overlay network node connected to the second overlay network node, and an empty second interface field that is without information of a second interface of the third overlay network node connected to the further host.

12. The first overlay network node of claim 9, wherein the first overlay network node is a branch gateway, and the second overlay network node is a virtual private network concentrator (VPNC).

13. The first overlay network node of claim 11, wherein the partially populated third entry in the updated multicast table as updated by the first overlay network node remains unpopulated with the information of the second interface of the third overlay network node after the updating at the first overlay network node.

14. The first overlay network node of claim 9, wherein the instructions are executable by the processing resource to:

receive, from the host, a join request including a multicast group identifier associated with the multicast stream; and determine that the host seeks to join the multicast stream based on the join request.

15. The first overlay network node of claim 14, wherein the instructions are executable by the processing resource to:

receive, from the host, a leave request to leave the multicast stream, wherein the leave request includes the multicast group identifier; and in response to the leave request, remove the information of the second interface from the updated multicast table.

16. A non-transitory machine-readable medium comprising instructions executable by a processing resource in a system for a software-defined wide area network (SD-WAN) to:

receive, at a multicast orchestrator, state information from overlay network nodes of the SD-WAN;

based on the state information, identify, from the overlay network nodes, a first overlay network node connected to a multicast source of a multicast stream and a second overlay network node connected to a host, wherein the second overlay network node comprises a first interface connected to the first overlay network node and a second interface connected to the host;

based on the identifying, compute a partially populated multicast table representing a multicast tree comprising a path connecting the first overlay network node and the second overlay network node, the partially populated multicast table comprising:

a first entry identifying respective interfaces of the first overlay network node connected to the multicast source and the second overlay network node, and a partially populated second entry comprising a populated first interface field identifying the first interface connected to the first overlay network node, and an empty second interface field that is without information identifying the second interface connected to the host; and distribute the partially populated multicast table to the first and second overlay network nodes to allow transmission of the multicast stream to the host; and update, at the second overlay network node, the partially populated second entry of the partially populated multicast table received at the second overlay network node by adding, to the empty second interface field, the information identifying the second interface connected to the host.

17. The non-transitory machine-readable medium of claim 16, wherein the partially populated second entry comprises a multicast source identifier of the multicast source, and a multicast group identifier of a multicast group associated with the multicast stream.

18. The non-transitory machine-readable medium of claim 16, wherein the information identifying the first interface comprises information of a tunnel between the first overlay network node and the second overlay network node.

19. The non-transitory machine-readable medium of claim 16, wherein the second overlay network node is a branch gateway, and the first overlay network node is a virtual private network concentrator (VPNC).

20. The non-transitory machine-readable medium of claim 18, wherein the information identifying the second interface comprises information of a link between the second overlay network node and the host.

* * * * *